United States Patent [19]

Nakagawa et al.

[11] Patent Number: 5,560,939
[45] Date of Patent: Oct. 1, 1996

[54] MOLD ASSEMBLY COMPRISING A SLIDING MOLD INSERT ADAPTED FOR AUTOMATED INSERTION AND REMOVAL

[75] Inventors: Tatsuzi Nakagawa, Kanagawa; Tatsuo Nishimoto, Fussa, both of Japan

[73] Assignees: Aida Engineering, Ltd., Kanagawa; Hoya Corporation, Tokyo, both of Japan

[21] Appl. No.: 670,470

[22] Filed: Mar. 13, 1991

Related U.S. Application Data

[63] Continuation of Ser. No. 343,378, Apr. 26, 1989, abandoned.

[30] Foreign Application Priority Data

Apr. 28, 1988 [JP] Japan .................. 63-106615
May 20, 1988 [JP] Japan .................. 63-66693 U
May 20, 1988 [JP] Japan .................. 63-123705

[51] Int. Cl.$^6$ .......................... B29C 43/36; B29C 45/26; B29C 45/76
[52] U.S. Cl. .......................... 425/139; 425/144; 425/183; 425/186; 425/190; 425/195; 425/547; 425/556; 425/589; 425/411; 425/437; 425/422; 425/810
[58] Field of Search .................. 425/577, 411, 425/183, 186, 190, 193, 195, 192 R, 556, 547, 589, 595, 437, 438, 810, 808, 444, 139, 144, 562; 264/2.2, 2.6, 106, 107

[56] References Cited

U.S. PATENT DOCUMENTS

| | | | |
|---|---|---|---|
| 2,233,057 | 2/1941 | Luce | 425/477 |
| 3,416,191 | 12/1968 | Richter et al. | 425/411 |
| 3,647,309 | 3/1972 | Thompson | 425/139 |
| 3,969,057 | 7/1976 | Pierre | 425/810 |
| 4,437,641 | 3/1984 | Stavitsky et al. | 425/810 |
| 4,462,780 | 7/1984 | Stavitsky et al. | 425/810 |
| 4,500,275 | 2/1985 | Ruhl | 425/192 R |
| 4,540,534 | 9/1985 | Grendol | 425/562 |
| 4,684,101 | 8/1987 | Wagner et al. | 425/192 |
| 4,772,196 | 9/1988 | Asai | 425/577 |
| 4,778,632 | 10/1988 | Bakalar | 425/562 |
| 4,820,149 | 4/1989 | Hatakeyama et al. | 425/577 |

FOREIGN PATENT DOCUMENTS

| | | | |
|---|---|---|---|
| 1255555 | 11/1967 | Germany | 425/193 |
| 3636585 | 5/1988 | Germany | 425/411 |
| 59-187223 | 11/1982 | Japan . | |
| 60-103536 | 6/1985 | Japan | 264/107 |
| 60-217114 | 10/1985 | Japan | 425/808 |
| 60-245528 | 12/1985 | Japan . | |
| 60-245512 | 12/1985 | Japan . | |
| 60-245525 | 12/1985 | Japan . | |
| 62-42815 | 2/1987 | Japan | 425/808 |
| 62-83121 | 4/1987 | Japan | 425/808 |
| 321382 | 2/1972 | U.S.S.R. | 425/411 |
| 88/09715 | 12/1988 | WIPO | 425/577 |

*Primary Examiner*—Khanh P. Nguyen
*Attorney, Agent, or Firm*—Greenblum & Bernstein P.L.C.

[57] ABSTRACT

A mold assembly having at least one mold body with at least one cavity formed therein. The mold includes at least one mold insert coupling portion formed on the mold body; at least one mold insert being of substantially complementary size and shape with respect to the mold insert coupling portion, each insert being provided with a tapered guide surface for guiding the mold insert into the mold insert coupling portion; at least one means for clamping the mold insert in a predetermined position within the mold insert coupling portion. The mold insert is reciprocally movable within the mold insert coupling portion in a direction generally perpendicular to the parting line of the mold assembly.

20 Claims, 7 Drawing Sheets

MOLD ASSEMBLY COMPRISING A SLIDING MOLD INSERT ADAPTED FOR AUTOMATED INSERTION AND REMOVAL

This application is a continuation, of application Ser. No. 07/343,378, filed Apr. 26, 1989 now abandoned.

BACKGROUND OF THE INVENTION

1. Field of the Invention

The present invention relates to a mold assembly, and methods of mounting and removing an insert or inserts thereof, method of ejecting the insert, and more particularly to mold assemblies useful for molding and the like of optical parts including lenses.

2. Description of the Related Art

In the mold assembly for injection molding out of the conventional mold assembly, in exchanging the molds, common parts are left as they are, without exchanging the mold as a whole, only some parts are exchanged, thereby trying to simplify the exchange work, decrease the mold cost, reduce stock space for molds, etc.

Examples of the conventional mold assembly as described above are disclosed in Japanese Patent Publication (Laid-Open) Nos. 60-245512, 60-245525 and 60-245528. These mold assemblies are concerned with a mold assembly for exchanging square-shaped inserts. The inset is inserted into an insert receiving recess provided on a mold body, and thereafter, the insert is moved in a direction parallel to a parting line of the mold, whereby the insert is pressed against a corner portion of the insert receiving recess, so that the insert can be positioned by two inner surfaces of the recess.

According to the above-described conventional technique, since the insert is moved in the direction parallel to the parting line in the insert receiving recess of the mold body to be positioned, the clearance between the insert and the insert receiving recess in this direction must be large. Pieces be molded by the above-described conventional mold assembly are limited to ones which are out of question even if the part for molding is movable in the direction parallel to the parting line, some molded pieces cannot be molded in a predetermined way, if the part for molding is made movable in this direction.

One example of the above is a case where the molded piece is a lens. When an insert for molding a lens is coupled into an insert coupling portion provided in the mold body so as to be movable in the direction parallel to the parting line, lens molding with high accuracy cannot be achieved. For this reason, in the above-described case, mounting and removing of the inserts with respect to the mold body should be contrived such that lens molding with a predetermined accuracy can be performed. For example, with the mold for lens molding, such an arrangement is required that, when only the insert is moved in a direction perpendicular to the parting line, positioning and clamping can be performed.

Since lenses are multiple types and small quantity products for producing lenses having various curvatures in a large number, there are a large number of inserts and many exchanges are performed. In order to reduce the molding cost and increase the production efficiency under the above-described conditions, it is necessary to automate the insert exchange, and contrivance of the above-described mounting of the insert to the mold body and removing it therefrom is required to be suitable for performing the automatic insert exchange.

In the mold assembly for injection molding, it is necessary to provide an ejecting means for ejecting a molded piece from a cavity at the time of mold parting in addition to an insert clamp movement means as described above.

When the insert is moved in the direction perpendicular to the parting line in order to mold a lens as described above, in providing these insert clamp movement means and ejecting means on the mold assembly for injection molding, such an arrangement is required that the insert clamp movement means and the ejecting means have reasonable relationships with the direction of movement of the insert.

Now, in the mold assembly for injection molding having a plurality of cavities, corresponding ejecting means are to be provided for the respective cavities. For example, in the mold assembly for molding lenses and the like, biasing and restoring operations by resilient members (springs, etc.) are utilized for pressing the ejecting means and return thereof to the initial positions.

Further, in Japanese Patent Publication (Laid-Open) No. 57-187223, there is disclosed such an ejecting means that a press-out pin and an abutting portion, against which the press-out pin is abutted, are integrally provided at the peripheral end portion of a molded piece such as a plastic lens.

However, in the mold assembly for injection molding having a plurality of ejecting means, for example, when all of the ejecting means are integrally joined together and these ejecting means are operated as a whole to eject molded pieces from the respective cavities, since respective resilient members acting on the ejecting means have pressure variations, and further, pressure distribution acting on the individually provided resilient members is not constant due to dispersions of the molding conditions, etc. of the molded pieces in the cavities, there is a problem in that forces given to the respective ejecting means cannot be made uniform. Further, such problems occur that an ejecting force cannot act on the center of the molded piece for this reason, and further, in this case, resin which has intruded into gaps formed between component parts of the mold at the time of ejecting cannot be separated reliably.

With the plastic lens molded by providing the abutting portion of the press-out pin on the peripheral end portion thereof, which is disclosed in the aforesaid Patent Publication (Laid-Open) No. 57-187223, it becomes necessary to provide fabricating for removing the abutting portion after the molding, and the arrangement of the insert of the mold becomes complicated.

SUMMARY OF THE INVENTION

It is an object of the present invention to provide a mold assembly and a method of mounting and removing an insert thereof, wherein the insert can be mounted to the mold assembly and removed therefrom such that molded pieces, such as a lens, can be molded with high accuracy and automation of the insert exchange work can be suitably performed.

It is another object of the present invention to provide a mold assembly, wherein, when such an arrangement is adopted that the insert is moved in the perpendicular direction to the parting line, an insert clamp movement means and ejecting means are reasonably arranged in relationship with the direction of movement of the insert.

It is a further object of the present invention to provide a mold assembly and a method of ejecting, wherein ejecting means provided on respective cavities can be operated in a predetermined manner, ejecting molded pieces from the cavities and return of the ejecting means after the ejection can be performed in a predetermined manner, and ejecting of the molded piece can be performed even if an abutting portion, against which a press-out pin is abutted, is not provided.

To achieve the above-described objects, the method of mounting and removing the insert in the mold assembly according to the invention features that, in the mold assembly, wherein the cavity is formed therein, the mold body can be divided into at least two and at least one insert is included therein, the insert is moved in the direction perpendicular to the parting line and the insert is inserted into or removed from an insert coupling portion formed in the mold body and having a shape and size suitable for the insert, thereby inserting the insert into the mold body or removing therefrom.

The mold assembly according to the invention features that, in the mold assembly, wherein a cavity is formed therein, the mold body can be divided into at least parts and at least one insert is included therein. The insert, coupling portion having the shape and size suitable for the insert is formed in the mold body and therein is held the insert to be coupled into this insert coupling portion and is provided at both sides thereof with guide surfaces tapered toward a direction of coupling. The mold body has an insert clamp movement means for inserting the insert into the insert coupling portion or removing the insert therefrom in the direction perpendicular to the parting line.

As a preferred embodiment of the mold assembly according to the invention, such an arrangement is adopted that the ejecting means is combined with the insert clamp movement means, and the ejecting means are provided as commensurate to the number of the mold cavities are controlled independently of one another.

The method of ejecting according to the invention features that the mold is opened after the molded piece is molded by the cavity in the mold assembly, and the insert for molding the molded piece is moved in the direction perpendicular to the parting line to thereby eject the molded piece.

DETAILED DESCRIPTION OF THE PREFERRED EMBODIMENTS

A drawings show the mold assembly for injection molding according to the invention. This mold assembly can mold lenses, using thermoplastic resins such as FMMA (polymethyl methacrylate) and PC (polycarbonate) in the molten state. The mold referred to here includes not only metallic molds but also of molds made of other materials such as glass and ceramics.

Figure 1:
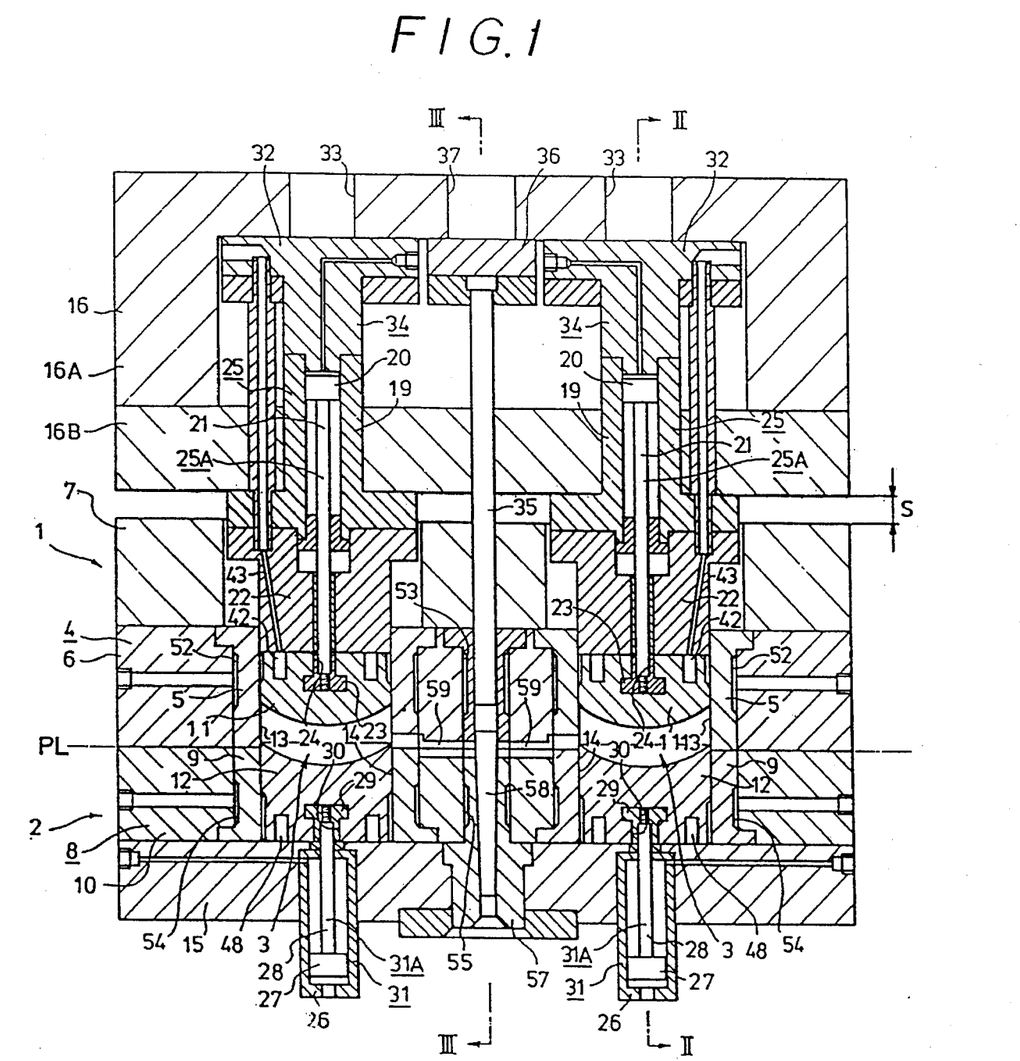
FIG. 1 is a front sectional view showing the mold assembly for injection molding of one embodiment according to the invention.

As shown in FIG. 1, the mold assembly for injection molding according to this embodiment is constructed such that two cavities 3 are formed between a top mold 1 and a bottom mold 2, for molding 3, for example two lenses. The top mold 1 and the bottom mold 2 are parted along a horizontal parting line PL. A mold body 4 of the top mold 1 is constituted by an insert guide member 5, and mold plates 6 and 7. A mold body 8 of the bottom mold 2 is constituted by an insert guide member 9 and a mold plate 10. Inserts 11 and 12 of the top mold 1 and bottom mold 2 are slidably provided in insert coupling portions 13 and 14 provided in the cylindrical insert guide members disposed vertically, and these inserts 11 and 12 are movable in a direction perpendicular to a parting line PL.

As these inserts 11 and 12, optical inserts used for lens molding are used.

Figure 2:
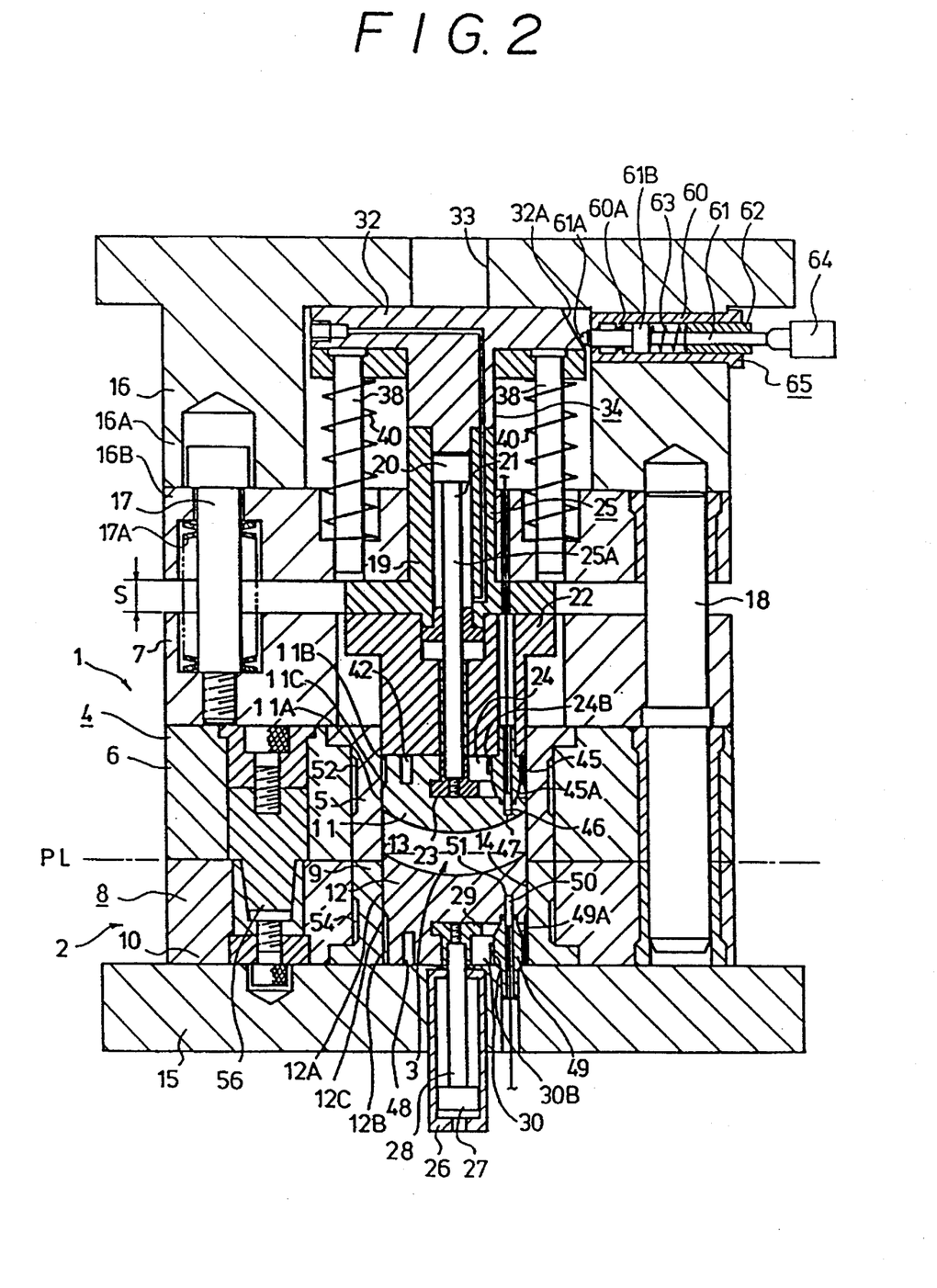
FIG. 2 is a sectional view taken along the line 2—2 in FIG. 1.

The bottom mold 2 is a stationary mold, and the mold body 3 of the bottom mold 2 is fixed to a mold mounting member 15. The mold body 4 of the movable top mold 1 is connected to a mold mounting member 16 including top and bottom members 16A and 16B via a bolt 17 shown in FIG. 2. A belleville spring 17A, provided around the outer periphery of the bolt 17, is confined between the mold body 4 and the mold mounting member 16. Since a clamp device of the mold assembly for injection molding according to this embodiment is of the direct pressure type, a downward clamping force of a clamping cylinder, not shown, directly acts on the mold mounting member 16. Since the mold assembly for injection molding according to this embodiment is provided for injection, a space S is formed between the mold body 4 of the top mold 1 and the mold mounting member 16 as shown in FIG. 2. The mold body 4 of the top mold 1 and the mold mounting member 16 are opened or closed by the space S in the vertical direction while being guided by a guide pin 18. Accordingly, this mold assembly for injection molding is adapted to be divided into parts in total. A cylinder, not shown, is disposed downwardly of the mold mounting member 15 of the mold body 8 of the bottom mold 2, and the mold mounting member 16 is pressed up by this cylinder against a clamping force of the clamping cylinder, whereby the space S is formed.

Figure 4:
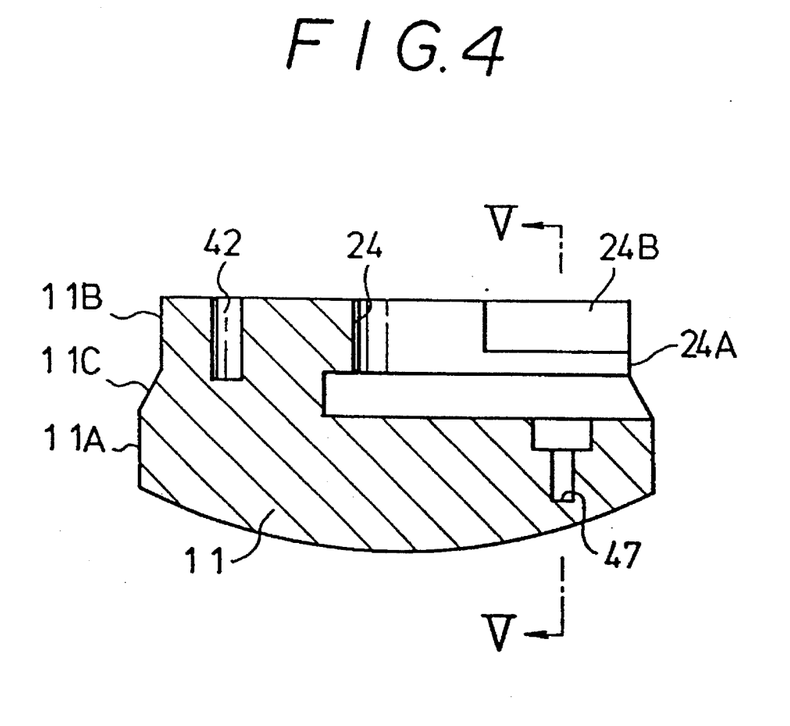
FIG. 4 is a sectional view of the insert.
Figure 5:
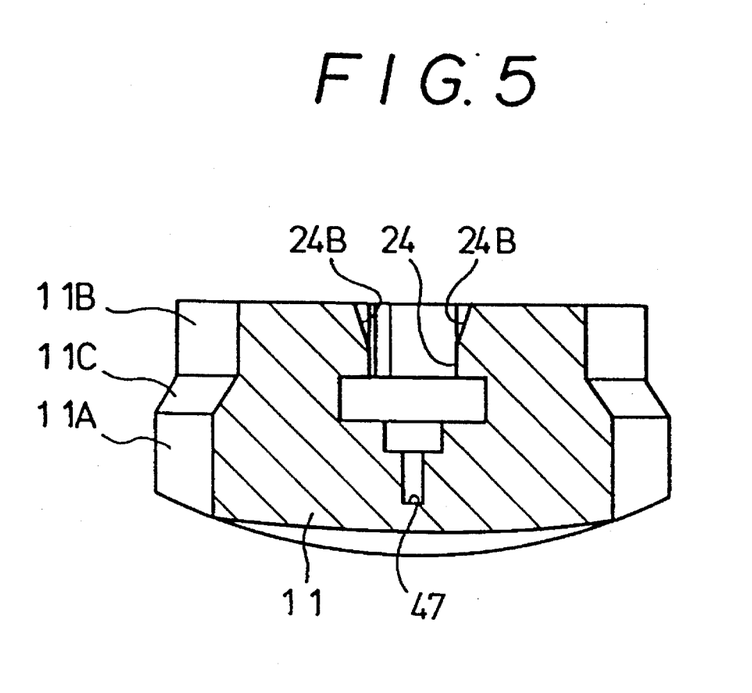
FIG. 5 is a sectional view taken along the line 5—5 in FIG. 4.

As shown in FIG. 1, a downwardly directed hydraulic cylinder 19 is provided on the mold mounting member 16, and a piston rod 21 of piston 20 of this cylinder 19 penetrates through a back insert 22 fixed to the undersurface of the cylinder 19 and secured at the bottom end thereof with a T-shaped clamp member 23. This T-shaped clamp member 23 is engageable with a T-shaped groove 24 being a guide groove formed in the insert 11. As shown in FIG. 4, one end portion of this T-shaped groove 24 is made as an open end portion 24A opened at the outer peripheral surface of the insert 11, and the T-shaped clamp member 23 can be guided to and engaged with the T-shaped groove 24 through this open end portion 24A. After this engagement, oil is supplied to or discharged from the hydraulic cylinder 19 to vertically move the piston rod 21, so that when the top mold I and the bottom mold 2 are divided, the insert 11 can be inserted into or removed from the insert coupling portion 13 of the mold body 4. The top end face of the insert 11 formed with the T-shaped groove 24 is abutted against the undersurface of the back insert 22, whereby the insert 11 is brought into a clamped state.

As described above, the hydraulic cylinder 19, the piston rod 21 of the piston 20, the back insert 22, the T-shaped clamp member 23 and the T-shaped groove 24 constitute a top mold insert clamp movement means 25 for clamping the insert 11. Out of the above-described members, the hydraulic cylinder 19 and the piston rod 21 of the piston 20 constitute a top mold insert movement means 25A for moving the insert 11 in the direction perpendicular to the parting line PL thereby allowing insertion of the insert 11 into the insert coupling portion 13 or removal therefrom. The back insert 22 is made as an insert receiving member for receiving the insert 11 such that the top end face of the insert 11 is abutted against the back insert 22.

A construction similar to the above is provided on the insert 12 of the bottom mold 2. An upwardly directed hydraulic cylinder 26 is fixed to the mold mounting member 15. A piston rod 28 of piston 27 of this cylinder 26 penetrates through the mold mounting member 15, and is secured at the top end thereof with a T-shaped clamp member 29, which is engageable with a T-shaped groove 30 formed on the bottom end face of the insert 12. The hydraulic cylinder 26, the piston rod 28 of the piston 27, the T-shaped clamp member 29, the T letter-shaped groove 30 and the mold mounting member 15 constitute a bottom mold insert clamp movement means 31. Out of the above-described members, the hydraulic cylinder 26 and the piston rod 28 of the piston 27 constitute a bottom mold insert movement means 31A for moving the insert 12 in the direction perpendicular to the parting line PL thereby allowing insertion of the insert into the insert coupling portion 14 or removal therefrom. The mold mounting member 15 is made as an insert receiving member for receiving the insert 12 such that the bottom end face of the insert 12 is abutted against the mold mounting member 15.

In the above-described case, a construction, necessary for preventing oil which leaks from the cylinder 19 from reaching the insert 11, is provided on the hydraulic cylinder 19. The thicknesses in the vertical direction of the inserts 11 and 12 are set at such values that, even if the inserts 11 and 12 are raised to a predetermined temperature, non-symmetrical thermal distortion is not generated to the insert 11 and 12 due to the T-shaped grooves 24 and 30.

The hydraulic cylinder 19 is provided on the mold mounting member 16 in a manner to be vertically slidable, and a pressure receiving member 32 for ejecting is fixed to the top end of the hydraulic cylinder 19. An eject rod, not shown, is inserted through a hole 33 formed in the mold mounting member 16. When the pressure receiving member 32 is pressed down, whereby the hydraulic cylinder 19, the back insert 22 and the insert 11 are also pressed down, so that the lenses molded by the cavities 3 can be ejected when the top mold 1 and the bottom mold 2 are divided.

Accordingly, the eject rod, the pressure receiving member 32, the hydraulic cylinder 19, the back insert 22, the insert 11, the piston rod 21 of the piston. 20 for fixing the insert 11 to the back insert 22, the T-shaped clamp member 23 and the T-shaped groove 24 constitute an ejecting means 34. The hydraulic cylinder 19, the back insert 22, the piston rod 21 of the piston 20, the T-shaped clamp member 23 and the T-shaped groove 24 are component parts of the top mold insert clamp movement means 25 and also are component parts of this ejecting means 34. The piston rod 21 is assembled into the center of the interiors of the both means 25 and 34.

As described above, the ejecting means 34 includes the top mold insert clamp movement means 25. In other words, the ejecting means 34 is constructed, utilizing the top mold insert clamp movement means 25. Thus, in the both means 25 and 34, the parts are commonly used, so that the number of the parts can be reduced and simplified construction can be achieved. Since the top mold insert clamp movement means 25 is provided in an installation space of the ejecting means 34, so that reasonable arrangements in these molds are performed and space saving is also achieved.

The above-described ejecting means 34 are respectively provided for the two cavities 3, have the constructions identical with each other and are operated independently of each other.

As shown in FIG. 1, an eject pin 35 is disposed at the central portion of the mold assembly for injection molding in a manner to be vertically slidable. A pressure receiving member 36 fixed to the top end of this eject pin 35 is inserted and pressed down by an eject rod inserted through a hole 37 of the mold mounting member 16, whereby the eject pin 35 is pressed down.

Figure 3:
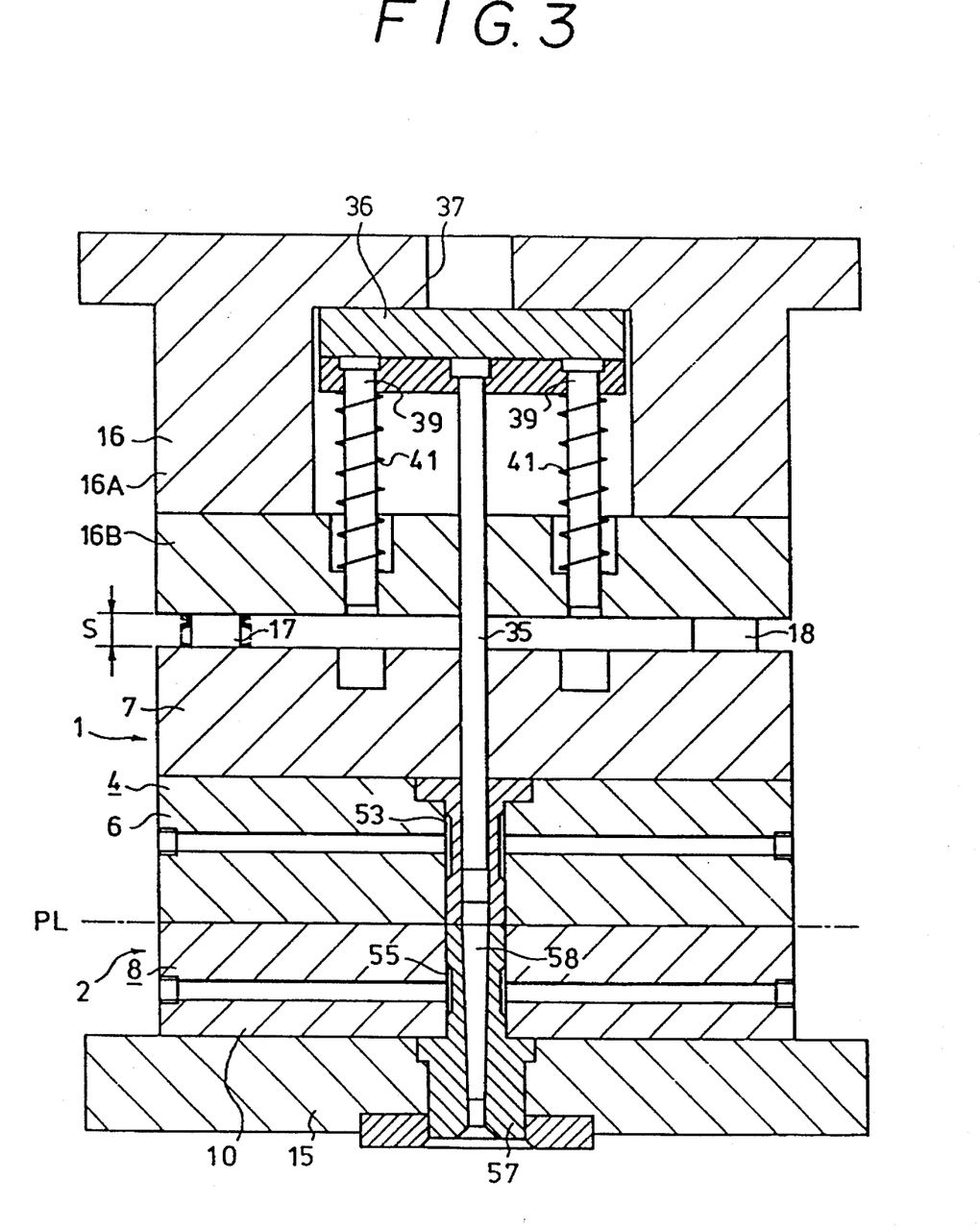
FIG. 3 is a sectional view taken along the line 3—3 in FIG. 1.

As shown in FIGS. 2 and 3, the above-described pressure receiving members 32 and 36 are acted on by biasing forces of springs 40 and 41 wound around the outer peripheries of eject return pins 38 and 39. Thus the eject rod is raised, the pressure receiving members 32, 36 and the like are raised to return to the initial positions.

As shown in FIG. 2, a tubular case 60 is fixed to the mold mounting member 16, and a detecting rod 61, inserted into the case 60, is slidable in the horizontal direction while being guided by a guide member 62. The detecting rod 61 is constantly biased by a spring 63 toward the pressure receiving member 32 of the ejecting means 34. A forward end 61A of the detecting rod 61 is abutted against a guiding inclined surface 32A formed on the side surface of the pressure receiving member 32. When the pressure receiving member 32 is lowered, an engageable portion 61B of the detecting rod 61 is engaged with a projection 60A of the case 60, whereby the detecting rod 61 is prevented from proceeding forward.

In the rear of the detecting rod 61, detectors 64 are secured to the mold mounting member 16 through brackets, not shown. The detectors 64 are limit switches. Proximity switches or the like may be used in place of the limit switches. When the ejecting means 34 is raised by the spring 40 and returned to the initial position upon ejecting the lenses molded by the cavities 3, the detectors 64 are operated by a detect rod 61 retracted by the guiding inclined surface 32A of the pressure receiving member 32.

A case 60, the detecting rod 61, the guide member 62, the spring 63 and the detectors 64 constitute a detecting means 65 for detecting the return of the ejecting means 34. The detecting means 65 are respectively provided for the ejecting means 34 respectively provided on the two cavities 3.

Figure 7:
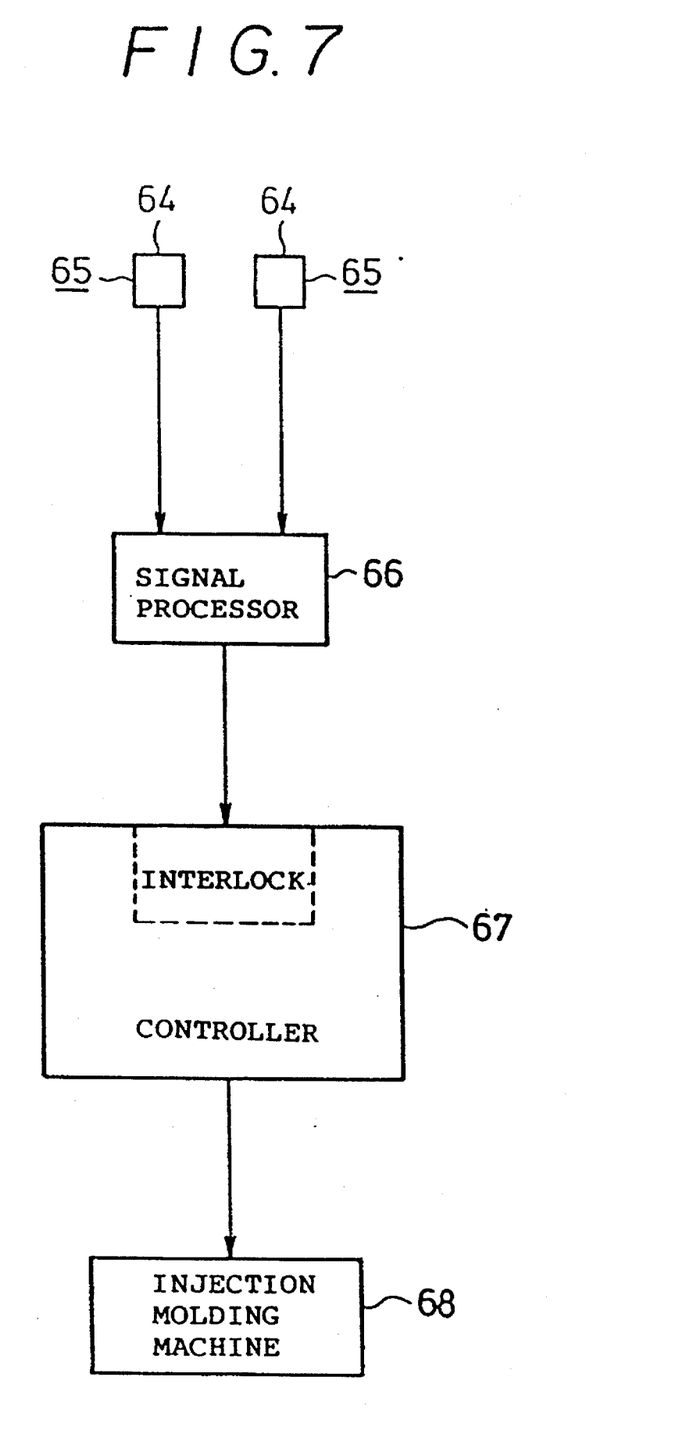
FIG. 7 is a control block diagram after a detecting means.

FIG. 7 shows the control block diagram after the detectors 64 of the detecting means 65. Signals from the two detectors 64 are delivered to a signal processor 66. This signal processor 66 is formed of an AND circuit or a logical circuit other than the AND circuit, for example. When the signals from the two detectors 64, which have detected the return of the respective ejecting means 34, are input to the signal processor 66, the signal processor 66 outputs a signal to a controller 67.

This controller 67 drivably controls an injection molding machine 68 in accordance with a program. The drivable control of the injection molding machine 68 by the controller 67 is interlocked until a predetermined signal is input to the controller 67. Here, the predetermined signals refer to signals indicating that the mold assembly for injecting molding is brought into a state where it is ready for the succeeding injection molding work. One of the signals is a signal from the signal processor 66 and the other is a signal concerning the magnitude of hydraulic pressure from a hydraulic circuit for supplying the hydraulic pressure to the hydraulic cylinders 19 and 26.

In FIG. 7, the signal processor 66 and the controller 67 are separately provided. However, the signal processor 66 may be provided as a part of the controller 67.

As shown in FIG. 2, the inserts 11 and 12 have stepped shapes, respectively including large diameter portions 11A and 12A, and small diameter portions 11B and 12B. Portions between the large diameter portions 11A and 12A, and the small diameter portions 11B and 12B are formed as guiding tapered surfaces 11C and 12C, respectively. The guiding tapered surfaces 11C and 12C provided along the whole peripheral side surfaces of the inserts 11 and 12, respectively. As described above surfaces 11C and 12C are declined so as to be tapered toward the coupling directions so that the inserts 11 and 12 can be coupled into the insert coupling portions 13 and 14. Since the mold assembly for injection molding according to this embodiment is provided for molding lenses as described above, the inserts 11 and 12, and the insert coupling portions 13 and 14 are formed into round shapes. Diameters of the insert coupling portions 13 and 14 are larger, by a very small amount (e.g. about several ten μm) than the large diameter portions 11A and 12A of the inserts 11 and 12. Consequently, the insert coupling portions 13 and 14 are formed into shapes and sizes suitable for the inserts 11 and 12.

Figure 6:
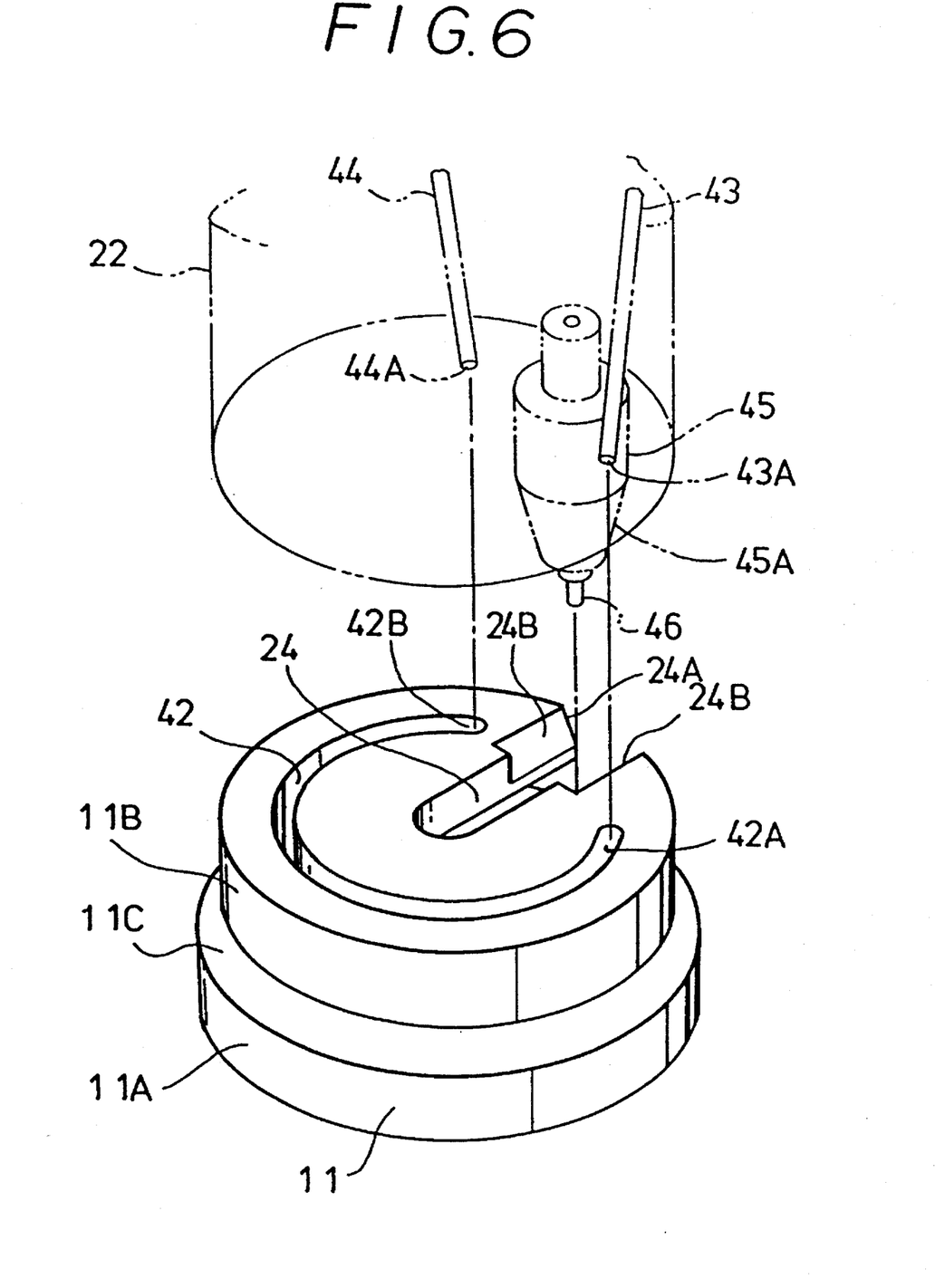
FIG. 6 is a perspective view showing the positional relationship between the insert and a positioning member.

As shown in FIG. 6, a C-shaped flow-through groove 42 is formed in the top end face of the insert 11. This flow-through groove 42 allows warmly conditioned fluid such for example as steam, water and air to flow therethrough and is a warmly conditioned fluid flow-through groove for setting the temperature of the insert 11 at a predetermined value before molding, during molding, and further, after molding, for example. The warmly conditioned fluid flow-through groove comprises a seal mechanism by an O-ring, not shown. Paths 43 and 44 for allowing the warmly conditioned fluid to flow into or flow out of this flow-through groove 42 are provided in the back insert 22.

When the top end face of the insert 11 is abutted against the back insert 22 as described above, a flow-in port 43A of the path 43, which is opened at the undersurface of the back insert 22 and a flow-out port 44A of the path 44, and opposite end portions 42A and 42B of the flow-through groove 42 are adapted to coincide with each other. A positioning member 45 for allowing this coincidence is fixed to the undersurface of the back insert 22. This positioning member 45 is inserted into a portion close to the open end portion 24A of the T-shaped groove 24, that is, a portion separated from the engaged portion with the T-shaped clamp member 23 to thereby position the insert 11. More specifically, the lower portion of the positioning member 45 is formed into a conical tapered surface 45A being tapered off toward the insert 11. A portion of the T-shaped groove 24, into which the positioning member 45 is inserted, is formed into an inclined surface 24B being flared toward the positioning member 45.

The positioning member 45 is secured thereto with a temperature sensor 46 formed of a thermocouple in a manner to project from the undersurface of the positioning member 45. As shown in FIG. 4, a small diameter hole 47 for receiving this temperature sensor 46 is formed on the bottom surface of the T letter-shaped groove 24. The temperature sensor 46 is provided for detecting the temperature at a position close to the molding surface of the insert 11.

The insert 12 has the construction identical with the above. More specifically, as shown in FIG. 2, the insert 12 has formed at the bottom end face thereof a warmly conditioned fluid flow-through groove 48. The mold mounting member 15 has fixed thereto a positioning member 49 for allowing the opposite end portions of the flow-through groove 48 to coincide with the flow-in and flow-out ports of the warmly conditioned fluid paths, not shown, which are provided in the mold mounting member 15, when the bottom end face of the insert 12 is abutted against the mold mounting member 15. This positioning member 49 is provided with a tapered surface 49A and the T-shaped groove 30 with an inclined surface 30B, respectively. The positioning member 49 is secured thereto with the temperature sensor 50, and the T-shaped groove 30 is formed at the bottom surface thereof with a small diameter hole 51 for receiving the temperature sensor 50.

As shown in FIG. 1, warmly conditioned fluid flow-through paths 52, 53, 54 and 55 are provided in the mold bodies 4 and 8 of the top and bottom molds 1 and 2 so that the temperature of these mold bodies 4 and 8 can be set at a predetermined value.

In the above, since the lenses having curvatures different from one another are molded in large numbers, the inserts 11 and 12, forming a pair by the top one and bottom one are prepared in a large numbers, which have lens molding surfaces having curvatures different from one another.

The operation will hereunder be described.

Figure 8:
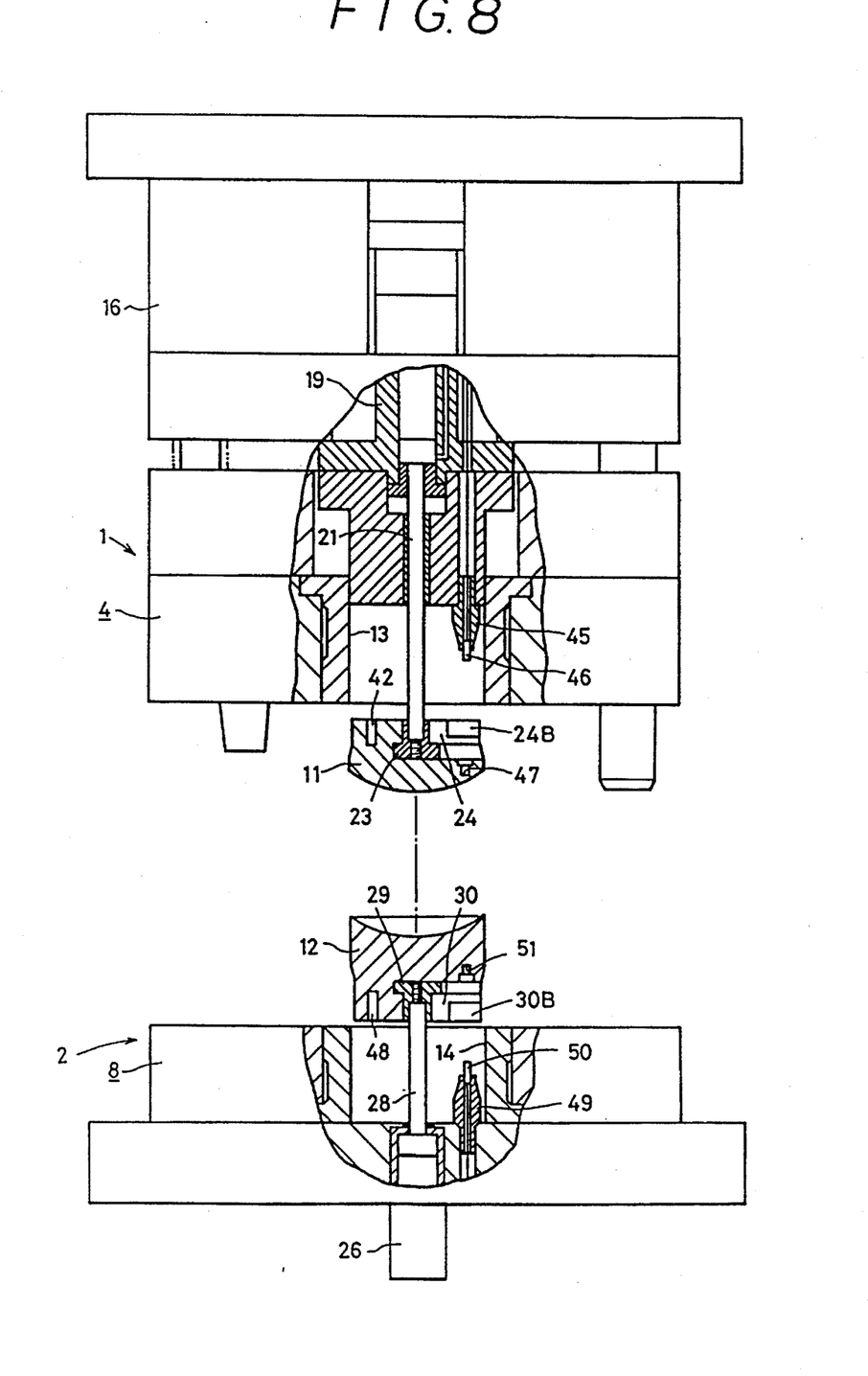
FIG. 8 is a partially sectional view showing the time of the mold opening.

When the insert 11 or 12 is exchanged, the top mold 1 including the mold mounting member 16 is raised and the top mold 1 and the bottom mold 2 are parted along the parting line PL. The piston rod 21 of the hydraulic cylinder 19 is lowered, the piston rod 28 of the hydraulic cylinder 26 is raised, and the T-shaped clamp members 23 and 29, which are secured to the forward ends of the piston rods 21 and 28 are projected from the insert coupling portions 13 and 14. The inserts 11 and 12, which are mounted to the mold bodies 4 and 8 of the top and bottom molds 1 and 2 and, being held by arms of a robot, not shown, are horizontally transferred from left to right in FIG. 8, whereby the T-shaped clamp members 23 and 29 begin to engage the T-shaped grooves 24 and 30 of the inserts 11 and 12 through the open end portions of these T-shaped grooves 24 and 30, T letter-shaped clamp members 23 and 29 engage terminal end portions of the T-shaped grooves 24 and 30, which reach the center portions of the inserts 11 and 12, while being guided by the T-shaped grooves 24 and 30 as acting guide grooves. FIG. 8 shows this state.

Henceforth, the piston rod 2 of the hydraulic cylinder 19 is raised to pull up the insert 11, and the piston rod 28 of the hydraulic cylinder 26 is lowered to pull down the insert 12. With this operation, the inserts 11 and 12 are coupled into the insert coupling portions 13 and 14, which have the shapes and sizes suitable for the inserts 11 and 12. However, since the guiding tapered surfaces 11C and 12C, which are tapered off toward the coupling directions as aforesaid, are provided on the side surfaces of the inserts 11 and 12, the inserts 11 and 12 are naturally and smoothly inserted into the insert coupling portions 13 and 14 through the guide actions of the guiding tapered surfaces 11C and 12C.

As described above, the inserts 11 and 12 are moved in the direction perpendicular to the parting line PL, whereby the inserts 11 and 12 are inserted into the insert coupling portions 13 and 14, which have the shapes and sizes suitable for the inserts 11 and 12. Upon completion of the insertion, the inserts 11 and 12 are disposed in the accurately positioned states relative to the insert coupling portions 13 and 14, the inserts 11 and 12 are mounted to the mold bodies 4 and 8 of the top and bottom molds 1 and 2 with a predetermined positioning accuracy, and mounting of the inserts 11 and 12 is easily performed.

The top end face of the insert 11 abuts against the back insert 22, whereby the insert 11 is clamped. This clamping is automatically performed when the insert 11 is moved by the piston rod 21 of the hydraulic cylinder 19 constituting the top mold insert clamp movement means 25 in the direction perpendicular to the parting line PL and reaches the upper limit. Thus, movement of the insert 11 necessary for positioning the insert 11 to the insert coupling portion 13 is utilized to clamp the insert 11. Since the piston rod 21 is located at the central portion of the insert 11, an abutting force of the insert 11 against the back insert 22 can be made uniform, so that the insert 11 can be reliably clamped.

After the inserts 11 and 12 begin to be inserted into the insert coupling portions 13 and 14, the tapered surfaces 45A and 49A of the positioning members 45 and 49 are engaged with the inclined surface 24B and 30B of the T-shaped grooves 24 and 30, whereby the inserts 11 and 12 are positioned in the circumferential direction through the guiding action of the tapered surfaces 45A and 49A, and of the inclined surfaces 24B and 30B, so that, when the top end face of the insert 11 abuts against the back insert 22 to be clamped, the opposite end portions 42A and 42B of the flow through groove 42 shown in FIG. 6 accurately coincide with the flow-in port 43A and the flow-out port 44A. When the bottom end face of the insert 12 abuts against the mold mounting member 15 to be clamped, as the opposite end portions of the flow-through groove 48 coincide with the flow-in port and the flow-out port, not shown. At this time, the temperature sensors 46 and 50 are inserted into the small diameter holes 47 an 51.

Incidentally, positionings of the inserts 11 and 12 in the diametral direction are performed when the T-shaped clamp members 23 and 29 are engaged with the terminal end portions of the T-shaped grooves 24 and 30.

Subsequently, the top mold 1 is lowered by the clamping cylinder, the top mold 1 and the bottom mold 2 are clamped while positioning the top and bottom molds relative to each other is performed by the guide pin 18 and a positioning pin as shown in FIG. 2, and the space S is eliminated. Thereafter, molten resin is injected through a nozzle of the injection molding machine, which is connected to a sprue bush 57. This molten resin is caused to flow through a sprue 58 and a runner 59 to be filled up in the cavities 3. At this time, the mold mounting member 16 is raised by a value of the space S by the cylinder against the clamping force of the clamping cylinder, whereby the dimensions of the cavities 3 in the vertical direction are increased. The temperatures of the top and bottom molds 1 and 2 are set at a required temperature by the warmly conditioned fluid, which has been caused to flow through the flow-through grooves 42, 48 and the flow-through paths 52, 53, 54 and 55. The temperatures of the inserts 11 and 12, close to the molding surfaces are detected by the temperature sensors 46 and 50.

The molten resin in the cavities 3 is gradually solidified. This solidifying is performed while the molten resin is receiving a pressure force of the insert 11 by the clamping force of the clamping cylinder, the insert 11 follows shrinkage of the molten resin due to the solidifying, and the insert 11 is lowered by the value of the shrinkage.

After the molten resin is solidified in cavities 3, the top mold 1 including the mold mounting member 16 is raised by the clamping cylinder to part the top mold 1. The bottom mold 2 and the pressure receiving members 32 and 36 are pressed down by the eject rod inserted through the holes 33 and 37, whereby the hydraulic cylinder 19 including the piston rod 21, the back insert 22, the insert 11 and the eject pin 35 are lowered, and molded pieces are ejected from the top mold 1 by the insert 11 and the eject pin 35.

Since ejection of the molded pieces from the cavities 3 is effected by the movement of the insert 11 as described above, ejecting is performed by all of the molding surface of the insert 11 and the ejecting force does not partially act on the lenses thus molded, so that the lenses cannot be damaged.

The molded pieces are ejected by the ejecting means 34 from the cavities 3 as described above. At the time of this ejection, the ejecting means 34 respectively provided on two cavities 3 are formed independently of each other for individual operations. Therefore, even if there are dispersions of the lens molding conditions, etc. in the cavities 3, the influence is not received, the ejecting forces do not act on the respective lenses thus molded in a state of being eccentric from the centers of the lenses. That is, the ejecting forces can act accurately on the centers of lenses, and the lenses can be ejected while the resin which has intruduced into the small space formed between the inserts 11 and 12, is being reliably cut.

The lenses are ejected by the movement of the insert 11 for molding the lens, so that there is no need of providing the abutting portion of the peripheral end portion, to which the press-out member such as the press-out pin is abutted, and the lenses can be ejected, while the lenses are prevented from being damaged.

When press-down of the pressure receiving members 32 and 36 by the eject rod is released, the ejecting means 34 and the eject pin 35 are returned to the initial positions by the springs 40 and 41. The return functions are individually performed by the respective ejecting means 34, and, along with the return of the ejecting means 34, the detecting rod 61 of the detecting means 35 is retracted through the agency of the guiding inclined surface 32A of the pressure receiving member 32 as shown in FIG. 2, thereby operating the detectors 64.

When the detectors 64 provided on the respective ejecting means 34 are operated as described above and signals from the detectors 64 are input to the signal processor 66, by inputting of the signal from the signal processor 66 and the other predetermined signals to the controller 67, the interlock of the controller 67, which has been effected after filling the molten resin into the cavities 3, is released. By releasing the interlock, the top and bottom molds 1 and 2 are clamped by the clamping cylinder for the succeeding injection molding work, and the succeeding injection molding work after the nozzle of the injection molding machine 68 is connected to the sprue bush 57 is started.

Although the respective ejecting means 34 are formed independent of each other, the return of all of ejecting means 34 are confirmed by the respective detecting means 65, and then, the succeeding injection molding work is started, so that, even if clamping is performed for the start of the injection molding work, damage of the ejecting means 34 due to the failure in return of the ejecting means 34 can be avoided and defects of molded pieces can be prevented.

When the inserts 11 and 12 are exchanged to mold the succeeding lenses after the above-described injection molding is repeated and a necessary number of the lenses are molded, the top and bottom molds 1 and 2 are parted.

Thereafter, the piston rod 21 of the hydraulic cylinder 19 is lowered and the piston rod 28 of the hydraulic cylinder 26 is raised, whereby the inserts 11 and 12, after use, are projected from the insert coupling portions 13 and 14. Thereafter, the inserts 11 and 12, held by the arms of the robot, are moved horizontally from right to left in FIG. 8 to remove the T-shaped clamp members 23 and 29 from the T-shaped grooves 24 and 30, thus removing the inserts 11 and 12. Inserts 11 and 12, which are held by the arms of the robot, are moved horizontally from left to right in FIG. 8, whereby, similarly to the above, the T-shaped clamp members 23 and 29 are engaged with the T-shaped grooves 24 and 30 of the inserts 11 and 12.

As descried above, according to this embodiment, the inserts 11 and 12 are moved in the direction perpendicular to the parting line PL and the inserts 11 and 12 are inserted into the insert coupling portions 13 and 14, which have the shapes and sizes suitable for the inserts 11 and 12, so that the inserts 11 and 12 can be accurately mounted positioned to the mold bodies 4 and 8 of the top and bottom molds 1 and 2. Thus the molding accuracy of the molded lenses can be highly improved. Although the shapes and sizes of the insert coupling portions 13 and 14 are suitable for the inserts 11 and 12, the inserts 11 and 12 are provided with the guiding tapered surfaces 11C and 12C. By merely moving the inserts 11 and 12 in the direction perpendicular to the parting line PL, the inserts 11 and 12 can be automatically inserted into the insert coupling portions 13 and 14 and the insert exchange work can be automatically performed.

Mounting the inserts 11 and 12 to the piston rods 21 and 28 of the hydraulic cylinders 19 and 26 and removing the inserts therefrom are performed by engagement of the T-shaped clamp members 23 and 29 with the T-shaped grooves 24 and 30, so that removal can be effected by merely moving the inserts 11 and 12 horizontally by a robotic arm. Even in this respect, the insert exchange work can be automatically performed.

Further, when the inserts 11 and 12 are coupled into the insert coupling portions 13 and 14, the opposite end portions of the warmly conditioned fluid flow-through grooves 42 and 48 coincide with the warmly conditioned fluid flow-in and flow-out ports through the action of the positioning members 45 and 49. Thus, when the inserts 11 and 12 are completely inserted into the insert coupling portions 13 and 14, preparation for causing the warmly conditioned fluid to flow through the flow-through grooves 42 and 48 is automatically effected.

As described above, according to this embodiment, the insert 11 is moved in the direction perpendicular to the parting line PL to be positioned in the insert coupling portion 13 of the mold body 4. The clamping direction of the insert 11 by the top mold insert clamp movement means 25 and the ejecting direction of the insert 11 by the ejecting means 34 coincide with the moving direction of the insert 11. Both the top mold insert clamp movement means 25 and the ejecting means 34 can be reasonable constructed to associate with the moving direction of the insert 11. The ejecting means 34 is constructed, utilizing the top mold insert clamp movement means 25, so that simplified construction and the like can be achieved. The ejecting means 34 is so constructed as to move the insert 11 to eject the molded lenses from the cavities 3, so that ejecting is performed by the molding surface of the insert as a whole. What differs from the case where the eject pin is abutted against the lens is that the problem of damaging the molded lens is not presented.

In the above-described embodiment, the detecting means 65 is constituted by the detecting rod 61, the detector 64 and the like. However, the construction of the detecting means 65 is not limited to this, and is optional. In short, any detecting means may be adopted and need only detect the return of the ejecting means 34, and further, the arrangement of the ejecting means is optional.

The mold assembly in the above-described embodiment has been provided for the compression molding. However, the invention is applicable to the conventional mold assembly for injection molding, in which no compression allowance is provided. The invention is applicable to the mold assembly other than the ones for lens molding, and is further applicable to molding in which the insert is provided on either the top mold or the bottom mold. The invention is applicable to a mold assembly in which the parting line is disposed in the vertical line.

The insert clamp movement means for moving the inserts in the direction perpendicular to the parting line to couple the same into the insert coupling portions or removal therefrom, is not limited to the constitution by the hydraulic cylinders and piston rods in the above embodiment, and may be constituted by a motor, ball screw, worm gear, cam and the like, for example.

As has been described hereinabove, according to the invention, the inserts can be mounted to or removed from the mold bodies so that the molded pieces can be molded with high accuracy. The respective inserts for molding products having different curvatures and the like such as the lenses can be easily mounted or removed, and the mold assembly becomes suitable for automating the insert exchange work.

When the construction in which the inserts are moved in the direction perpendicular to the parting line is adopted, the insert clamp movement means and the ejecting means may have the reasonable arrangements associated with the moving direction of the inserts, and dispositions of the insert clamp movement means and the ejecting means in the mold assembly can be performed reasonably.

Further, the ejecting means, having constructions independent from each other, are provided on the respective cavities, so that ejecting of the molded pieces by the ejecting means and returns of the ejecting means after ejecting can be performed in the predetermined manner. The detecting means, for detecting the return, are provided on the respective ejecting means, whereby the succeeding injection molding work can be performed after the return of all ejecting means is confirmed. Thus, damages of the ejecting means and occurrence of defective molded piece due to failure in return of the ejecting means can be avoided. Moreover, the inserts for molding the molded pieces are moved to eject the molded pieces. Thus, there is no need of providing the abutting portion where the press-out member, such as the press-out pin, is abutted against the molded piece. Thus, the fabrication for removing this abutting portion is dispensed with, simplifying the arrangements of the inserts.

What is claimed is:

1. A mold assembly having at least one mold body with at least one cavity formed therein, said mold assembly divided into at least two portions at a parting line, said mold assembly comprising:

at least one mold insert coupling portion formed on said at least one mold body of said mold assembly;

at least one mold insert being of substantially complementary size and shape of said at least one mold insert coupling portion;

said at least one mold insert having a first end having a first predetermined length with a first diameter, a second end having a second predetermined length with a second diameter, said first diameter being less than said second diameter, and a tapered mold insert guide portion formed between said first end and said second end adapted to guide said at least one mold insert into said at least one mold insert coupling portion;

at least one means for clamping said at least one mold insert in a predetermined position within said at least one mold insert coupling portion; and at least one means for reciprocally moving said at least one mold insert within said at least one mold insert coupling portion, whereby said second end portion is slidably engageable within said insert coupling portion, in a direction generally perpendicular to said parting line of said mold assembly.

2. A mold assembly according to claim 1, wherein said means for reciprocally moving said at least one mold insert is adapted to move said at least one mold insert into said at least one mold insert coupling portion.

3. A mold assembly according to claim 1, wherein said means for reciprocally moving said at least one mold insert is adapted to remove said at least one mold insert from said at least one mold insert coupling portion.

4. A mold assembly according to claim 1, wherein said means for reciprocally moving said at least one mold insert is adapted to move said at least one mold insert in either an insertion direction or a removal direction within said at least one mold insert coupling portion.

5. A mold assembly according to claim 1, wherein said at least one mold insert further comprises at least one guide groove formed on an end face of said at least one mold insert, further wherein at least one guide groove is adapted to receive at least one member secured to said reciprocal moving means.

6. A mold assembly according to claim 5, wherein said at least one guide groove is a T-shaped groove, further wherein said at least one member is a corresponding T-shaped clamp member.

7. A mold assembly according to claim 6, wherein a fluid flow-through groove is formed on said end face, said end face being adapted to abut with an insert receiving member affixed to said reciprocal moving means, said insert receiving member comprising ports adapted to allow continuous fluid flow through said fluid flow-through groove, and means for aligning said fluid flow-through groove and said ports.

8. A mold assembly according to claim 7, wherein said ports comprise a fluid flow-in port and a fluid flow-out port.

9. A mold assembly according to claim 8, wherein said means for aligning comprises a positioning member formed on said insert receiving member adapted to engage a surface of said T-shaped groove thereby aligning end portions of said fluid flow-through groove with said fluid flow-in port and said fluid flow-out port, respectively.

10. A mold assembly according to claim 1, wherein said means for reciprocally moving comprises at least one hydraulic cylinder.

11. A mold assembly according to claim 1, wherein said at least one mold insert is provided with a lens molding surface having a predetermined curvature.

12. A mold assembly according to claim 1, wherein said at least one mold insert is an optical insert for molding a lens.

13. A mold assembly according to claim 1, wherein said reciprocal moving means is further provided with means for ejecting a molded piece, said ejecting means being adapted to eject said molded piece in a direction generally perpendicular to said parting line.

14. A mold assembly according to claim 13, wherein at least two ejecting means are provided, said at least two ejecting means being independently operable.

15. A mold assembly according to claim 14, wherein said ejecting means further comprises means for detecting when said ejecting means is in a return position.

16. A mold assembly according to claim 13, wherein said mold assembly is adapted to be used for injection molding of lenses.

17. A mold assembly according to claim 13, wherein said mold assembly is adapted to be used for compression molding of lenses.

18. A mold assembly according to claim 7, wherein said aligning means is provided with a temperature sensor.

19. A mold assembly divided into at least two portions at a parting line, the mold assembly comprising:

at least one mold body having at least one cavity formed therein, at least one mold insert coupling positioned at least partially within the cavity in the mold body, wherein the mold insert coupling has a linear passageway therethrough, wherein the linear passageway defines a linear axis through the linear passageway;

a mold insert positioned at least partially within the passageway through the mold insert coupling, wherein the mold insert has a reduced innermost diameter, a full outermost diameter, a tapered mold insert guide surface between the innermost diameter and the full diameter, and a section of constant outermost diameter extending axially inward from the outermost diameter to an outermost portion of the tapered surface, wherein the innermost reduced diameter together with the tapered mold insert guide surface facilitate installation of the mold insert into the mold, and wherein the section of constant outermost diameter is sized so that upon installation of the mold insert into the mold insert guide members, the mold insert has a diameter which permits substantial movement of the mold insert along an axis of the linear passageway, without permitting any substantial radial movement of the mold insert.

20. A mold assembly divided into at least two portions at a parting line, the mold assembly comprising:

at least one mold body having at least one cavity formed therein, at least one mold insert coupling positioned at least partially within the cavity in the mold body, wherein the mold insert coupling has a linear passageway therethrough, wherein the linear passageway defines a linear axis through the passageway;

a mold insert positioned at least partially within the passageway through the mold insert coupling, wherein the mold insert has a reduced innermost diameter, a full outermost diameter, a tapered mold insert guide surface between the innermost diameter and the full diameter, and a section of constant outermost diameter extending axially inward from the outermost diameter to an outermost portion of the tapered mold insert guide surface, wherein the innermost reduced diameter together with the tapered mold insert guide surface facilitate installation of the mold insert into the mold, and wherein the section of constant outermost diameter is sized so that upon installation of the mold insert into the mold insert guide members, the mold insert has a diameter which permits substantial movement of the mold insert along an axis of the linear passageway, without permitting any substantial radial movement of the mold insert;

at least one means of clamping the mold insert in a predetermined position within the mold insert coupling portion; and at least one means for reciprocally sliding the mold insert within the mold insert coupling portion, whereby the mold insert is positioned within the mold insert coupling portion, in a direction generally perpendicular to said parting line of said mold assembly.

\* \* \* \* \*

UNITED STATES PATENT AND TRADEMARK OFFICE
CERTIFICATE OF CORRECTION

PATENT NO. : 5,560,939
DATED : October 1, 1996
INVENTOR(S) : T. NAKAGAWA et al.

It is certified that error appears in the above-indentified patent and that said Letters Patent is hereby corrected as shown below:

On the cover, in section [75], "Inventors:", line 2, change "Fussa" to ---Tokyo---.

Signed and Sealed this

Seventeenth Day of June, 1997.

Attest:

BRUCE LEHMAN

Attesting Officer

Commissioner of Patents and Trademarks